United States Patent Office 3,072,655
Patented Jan. 8, 1963

---

3,072,655
N-BENZYLOXYCARBONYLAMINO-PYRAZINOIC ACID AND DERIVATIVES
Humphrey I. X. Mager, De Ruyterstraat 34, Leidschendam; Wouter Berends, Kanaalweg 5A, Delft; and Willem J. Schut, Tulpencroftlaan 6, Heiloo, Netherlands
No Drawing. Filed Feb. 1, 1961, Ser. No. 86,293
4 Claims. (Cl. 260—250)

The present invention relates to new and novel derivatives of pyrazine 2,5-dicarboxylic acid and relates more particularly to substituted 2-(N-benzyloxycarbonylamino)pyrazines of the following formula:

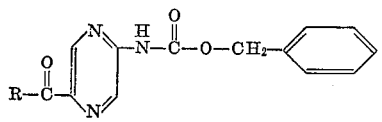

wherein R is an amino group, a lower alkoxy group, for example methoxy, ethoxy, propoxy, isopropoxy, sec-butoxy, n-butoxy or t-butoxy groups, or a hydroxy group. These compounds are useful as analeptics and as intermediates in the production of other compounds containing a pyrazine nucleus.

It has now been found that those compounds of this invention having the formula:

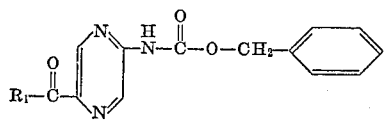

wherein $R_1$ is amino or lower alkoxy may be prepared from azides of the formula:

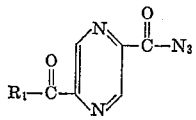

by treatment of the azide with anhydrous benzyl alcohol. It has been found that the compounds of this invention having the formula:

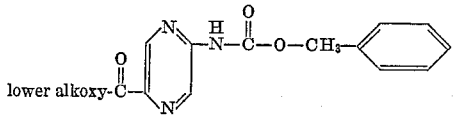

may be hydrolyzed to form 2-(N-benzyloxycarbonylamino)pyrazine 5-carboxylic acid by treatment with an alkali metal hydroxide, for example potassium hydroxide, at room temperature followed by treatment with hydrochloric acid.

The starting materials of the formula:

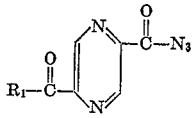

are prepared from pyrazine 2,5-dicarboxylic acid as described in our applications entitled "Substituted Pyrazine Dicarboxylic Acid Derivatives," Serial Nos.: 86,294 and 86,295, filed concurrently herewith. Pyrazine 2,5-dicarboxylic acid is catalytically esterified with a lower aliphatic alcohol in the presence of concentrated sulfuric or hydrochloric acid as the catalyst to form 2,5-di(lower alkoxy) carbonylpyrazines. These compounds may be treated with ammonium hydroxide in alcoholic solution to form 2-carbamoyl-5-(lower alkoxy) carbonylpyrazines which in turn are reacted with hydrazine hydrate in boiling 99% ethanol to form 2-carbamoylpyrazine 5-carboxyhydrazide. This compound is converted to the starting material 2-carbamoylpyrazine 5-carboxylic acid azide by treatment with sodium nitrite in aqueous acid solution at 0° C. to 5° C.

The 2,5-di(lower alkoxy)carbonylpyrazines may also be reacted with hydrazine hydrate in the cold in 99% ethanol to form 5-(lower alkoxy)carbonylpyrazine 2-carboxyhydrazide which is converted to the starting material 5-(lower alkoxy) carbonylpyrazine 2-carboxylic acid azide by treament with sodium nitrite in aqueous acid solution at 0° C. to 5° C.

In order further to illustrate this invention but without being limited thereto, the following examples are included:

*Example I*

A quantity of 1.08 g. of 2-carbamoylpyrazine 5-carboxylic acid azide is suspended in 40 ml. freshly purified anhydrous benzyl alcohol. The mixture is slowly heated to 100° C. with constant stirring. The temperature is maintained at 100° C. for about 30 minutes until gas evolution ceases. The mixtures is then heated to 150° C. and held at this temperature for 15 minutes. The mixture is cooled to −5° C. and the precipitate is recovered by filtration, washed four times with 3 ml. portions of ether and dried at 100° C.

Yield: 1.24 g. (82%) of 2-(N-benzyloxycarbonylamino) - 5 - carbamoylpyrazine. Two recrystallizations from tetrahydrofuran yield white crystals of the product, melting point of 230° C. (dec.) on rapid heating.

*Example II*

A quantity of 884 mg. 5-ethoxycarbonylpyrazine 2-carboxylic acid azide is suspended in 2.5 ml. freshly purified anhydrous benzyl alcohol and the mixture is slowly heated over a perior of two hours to 100° C. with stirring. The mixture is held at 100° C. for 15 minutes, allowed to cool to room temperature and is chilled overnight in an ice chest at −5° C. The solid is separated by filtration and washed three times with 3 ml. portions of ice-cold ether. The crude product is boiled in 20 ml. 96% ethanol, the solids separated by filtration and washed with two 5 ml. portions of hot 96% ethanol. The filtrate is concentrated to 5 ml. and chilled to −5° C. The colorless crystals are filtered off, washed with 5 ml. of cold ether and dried over $P_2O_5$.

Yield: 800 mg. (67%) of 2-(N-benzyloxycarbonylamino)-5-ethoxycarbonylpyrazine, melting point=141.5° C.

*Example III*

A quantity of 1.50 g. 2-(N-benzyloxycarbonylamino)-5-ethoxycarbonylpyrazine is dissolved in 100 ml. acetone. 300 ml. 1 N KOH are added and th solution is maintained at room temperature for 3 hours.

150 ml. conc. HCl are added with stirring. The mixture is cooled to 0° C. and the white flocculent precipitate is filtered off and washed four times with 10 ml. portions of ice-cold water until free from chloride ions. The yield, after drying, is 1.20 g. (88%).

This material is recrystallized from 160 ml. 96% ethanol. After the solution is cooled to −5° C., the crystals are filtered off, washed twice with 10 ml. portions of ice-cold ethanol and dried in a vacuum desiccator over $P_2O_5$. Yield: 1.05 g. 2-(N-benzyloxycarbonylamino)pyrazine 5-carboxylic acid, melting point 197.5–198° C. (dec.).

It is understood that the foregoing detailed description is given merely by way of illustration and that many variations may be made therein whithout departing from the spirit of our invention.

Having described our invention, what we desire to secure by Letters Patent is:

1. Compounds of the formula:

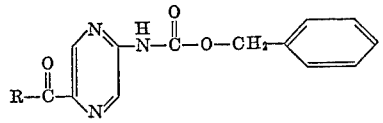

wherein R is a member of the group consisting of amino, lower alkoxy and hydroxy.

2. 2-(N-benzyloxycarbonylamino) - 5 - carbamoylpyrazine.

3. 2-(N-benzyloxycarbonylamino) - 5-ethoxycarbonylpyrazine.

4. 2 - (N - benzyloxycarbonylamino)pyrazine 5 - carboxylic acid.

No references cited.